2 Sheets—Sheet 1.

J. W. ANDERSON.
JUMP SEAT FOR CARRIAGES.

No. 247,871. Patented Oct. 4, 1881.

Attest:
R. F. Barnes
J. C. Lathrop

Inventor:
John W. Anderson
per Theophilus Weaver
His Attorney

2 Sheets—Sheet 2.
J. W. ANDERSON.
JUMP SEAT FOR CARRIAGES.
No. 247,871. Patented Oct. 4, 1881.
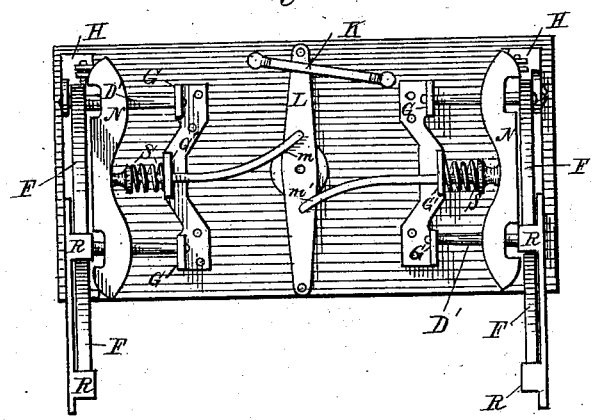
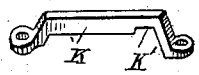
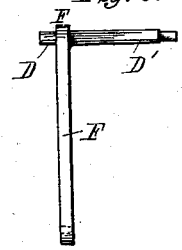
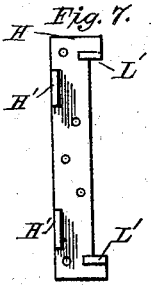
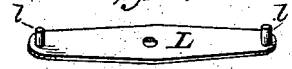
Attest:
R. F. Barnes
J. C. Lathrop
Inventor:
John W. Anderson
per Theophilus Weaver
His Attorney

UNITED STATES PATENT OFFICE.

JOHN W. ANDERSON, OF LANCASTER, PENNSYLVANIA.

JUMP-SEAT FOR CARRIAGES.

SPECIFICATION forming part of Letters Patent No. 247,871, dated October 4, 1881.

Application filed March 12, 1879.

*To all whom it may concern:*

Be it known that I, JOHN W. ANDERSON, of Lancaster city, county of Lancaster, and State of Pennsylvania, have invented a new and useful Improvement in Jump-Seats for Carriages, which improvement is fully set forth in the following specification, reference being had to the accompanying drawings.

The object of my invention is to provide a complete set of seat-irons for front and rear seats of carriages, that may be put upon the market in connected fixtures having the following special features: First, the hinged parallel supports at each end of seat are both caught and held by a pivoted notched stop-latch to secure the seat against forward and backward lunging; second, the said supports at both ends of seat, combined with said stop-latches, connectedly arranged to be stopped and tripped simultaneously; third, the said supports and latches at each end of seat connectedly arranged to be operated by a trip-lever at either side of seat.

Figure 1:
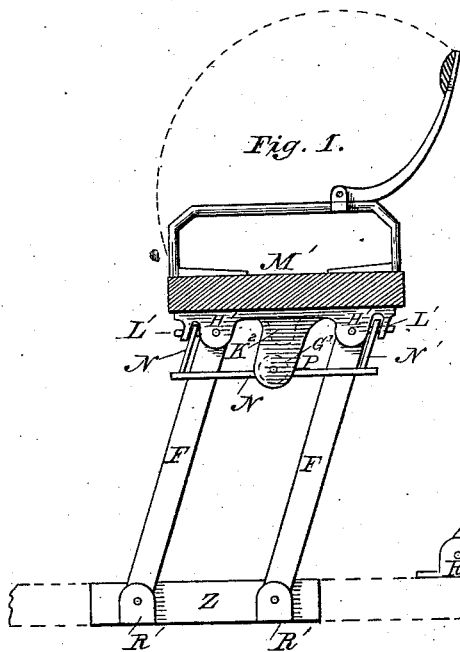
Figure 2:
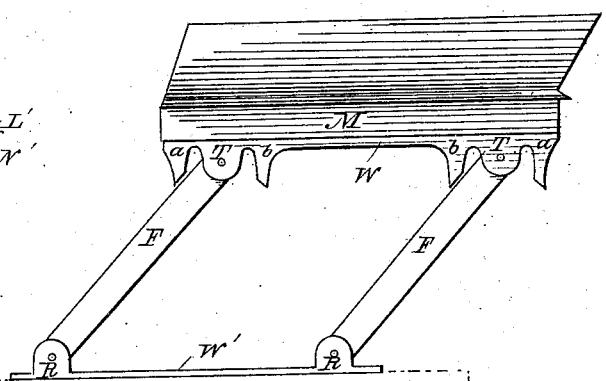

The vehicle to which my invention relates is two-seated, and Figures 1 and 2 of drawings represent the front and the rear seats thereof in position for occupancy. When it is desired to form a one-seated vehicle the front seat is adjusted and let down rearward, and the rear seat is jumped forward to stand over the other.

Figure 3:
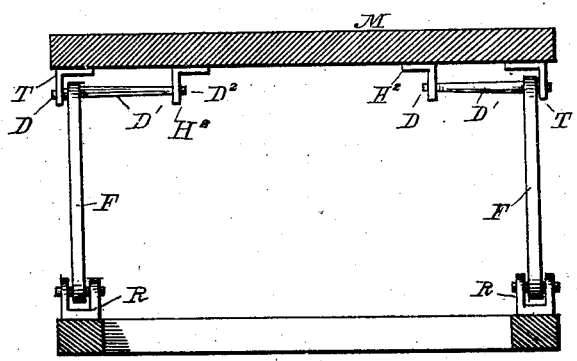

Fig. 3 represents a cross-section of rear seat and its supports attached. Fig. 4 represents a view of under side of front seat, and the supports and latching devices thereon. The remaining figures represent as follows: Fig. 5, the shifting-lever catch; Fig. 6, one of the seat supports or legs; Fig. 7, one of the front-seat attaching-irons for legs; Fig. 8, one of the spring-latches for holding legs locked erect;
Fig. 9, one of the front-seat bearing-plates for trunnions on legs and for spring on stem of spring-latch, and Fig. 10 the shifting-lever for operating the spring-latches when letting down front seat.

The supports or legs for the seats M M' are made in form as shown in Fig. 6, having the standard part F and the cross-head or transverse part D D' formed solid on one or on both its end, and the ends D and D' of said transverse part are trunnions which form their own rivet-connections with the attaching-plates T H² R and H' G R'. This form of seat-support is expressly designed to firmly mount the seat against lateral strain and to be unobstructive.
The attaching-plates shown in Figs. 7 and 9 are for front seat, M', the former of which has the flanges H' H' thereon for attaching thereto the trunnions D D, and the flanges L' L' for pivoting thereto the ends N' N' of latch N.
(Shown in Fig. 8.) Said latch N has in it the notches O' O', by which the standards F F are caught and held, as shown in Fig. 1, and has on the middle of its rear side the projection X, by which the stem m or m' is attached, which holds the latch-actuating spring S. Plate G, substantially as shown in Fig. 9, has on it the standard G', which supports said spring S at its foot. Said latches N N are attached to plates H H at flanges L' L' thereon, and are connected by rods m and m' with the trip-lever L, which is pivoted at its middle to the middle of the under side of seat. The springs S S keep the latches pressed to place of duty against the standards F F when held erect by them in latched position. Said latches, moreover, are provided with strikes or beveled ends, so that when the seat is let down they may automatically find their catch on said standards when the seat is being raised. A safety-catch, K, in staple form, incloses one end of lever L, which, when the seat is erected, is sprung into and held by it in an offset, K', and is thus secured so that no sudden jar or side-thrust may displace the latches from their hold on said standards.

On the under side of sill-iron is formed thereon, at its middle, the stop K², on which the supports F F set or rest when seat M' is let down either in front part of carriage or rearward to form a commodious child's seat, of about half the usual height of carriage-seats. The irons W of rear seat, M, are provided with the lugs *a b a b*, by which the seat is stopped or set both ways.

It is observable that either end of lever L may be easily reached at the front or the rear side to trip it to let seat M' down.

Having thus fully and clearly described my invention, what I regard as new and useful is embraced in the following claim:

1. In a jump-seat fixture for carriages, a pair of parallel shifting-supports for either end of seat, pivoted to irons for attaching the same to seat board and sill, in combination with a double notched spring-latch for catching and holding both said supports at same end of seat, and pivoted to attaching-irons, substantially as set forth.

2. In a jump-seat for carriages, the stop-latches N N', provided with notches C' C', and pivoted to flanges L' L', and actuated by springs S S, in combination with supports F for seat M', and operating substantially as and for the purpose set forth.

3. A couple of jump-seat fixtures, one for each end of seat, each consisting of supports F F, pivoted to attaching-irons H G, and latch N, pivoted to attaching-iron H, in combination with springs S S, latch-connectors $m\ m'$, and latch-operating lever L, all arranged for operation substantially as set forth.

In testimony that I claim the foregoing as my invention I have hereunto set my hand and seal this 11th day of February, 1879.

JOHN W. ANDERSON. [L. S.]

Attest:
  THEOPHILUS WEAVER,
  D. A. KEPNER.